H. E. STILLIANS.
TRANSMISSION MECHANISM.
APPLICATION FILED JAN. 23, 1917.

1,250,695.

Patented Dec. 18, 1917.
3 SHEETS—SHEET 1.

INVENTOR
Harry E. Stillians.

WITNESSES

BY

ATTORNEY

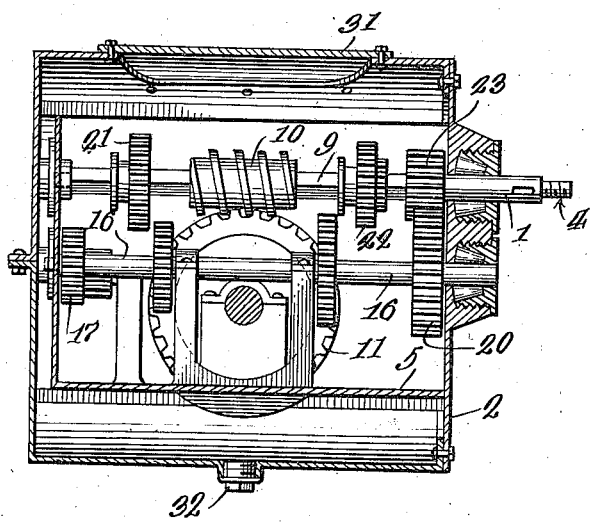
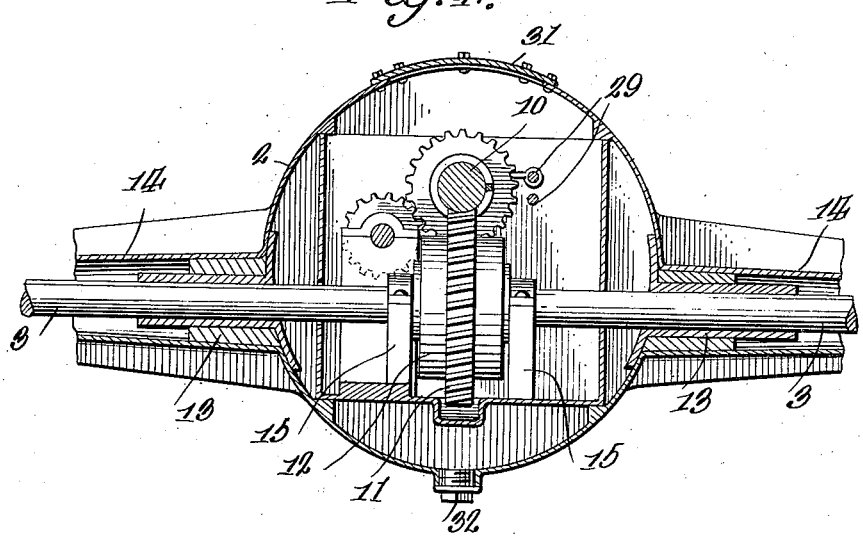

H. E. STILLIANS.
TRANSMISSION MECHANISM.
APPLICATION FILED JAN. 23, 1917.
1,250,695.
Patented Dec. 18, 1917.
3 SHEETS—SHEET 3.
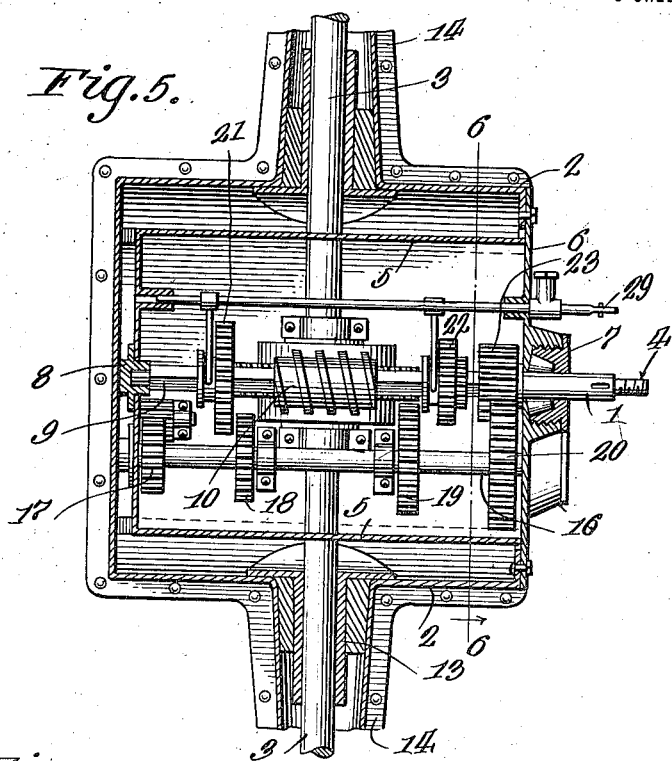
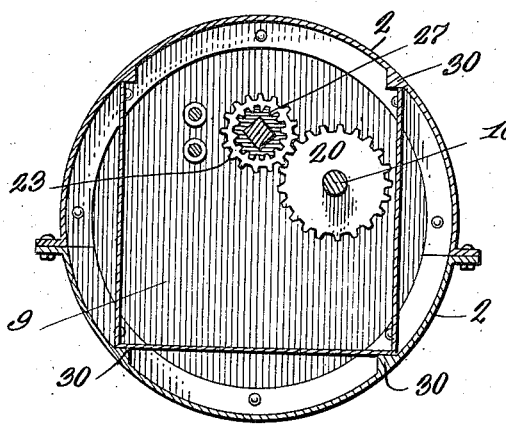
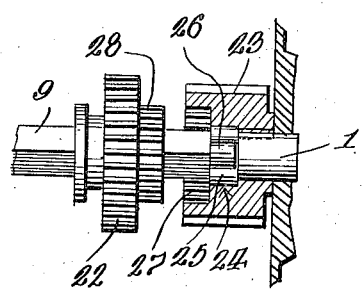
INVENTOR
Harry E. Stillians
WITNESSES
Guy M. Spring
BY Richard Oliven.
ATTORNEY

UNITED STATES PATENT OFFICE.

HARRY E. STILLIANS, OF MARATHON, TEXAS.

TRANSMISSION MECHANISM.

1,250,695. Specification of Letters Patent. Patented Dec. 18, 1917.

Application filed January 23, 1917. Serial No. 143,957.

*To all whom it may concern:*

Be it known that I, HARRY E. STILLIANS, a citizen of the United States, residing at Marathon, in the county of Brewster and State of Texas, have invented certain new and useful Improvements in Transmission Mechanisms, of which the following is a specification.

An object of my invention is to provide a power transmission mechanism for motor vehicles, and it consists in the constructions, combinations and arrangements, herein described and claimed.

An object of my invention is to provide a transmission mechanism having the differential driving devices and the transmission gearing inclosed in a single casing.

Another object of the invention is to provide a gear housing being installed in its place on the rear axle as a unit.

Other objects and advantages will appear in the following specification reference being had to the accompanying drawings forming a part thereof in which:

Fig. 3 is a section on the line 3—3 of Fig. 1,

Fig. 4 is a section on the line 4—4 of Fig. 2,

Fig. 5 is a horizontal section on the line 5—5 of Fig. 1,

Fig. 6 is a cross section on the line 6—6 of Fig. 5, and

Fig. 7 is a detail sectional view of a portion of the device hereinafter to be referred to.

Figure 1:
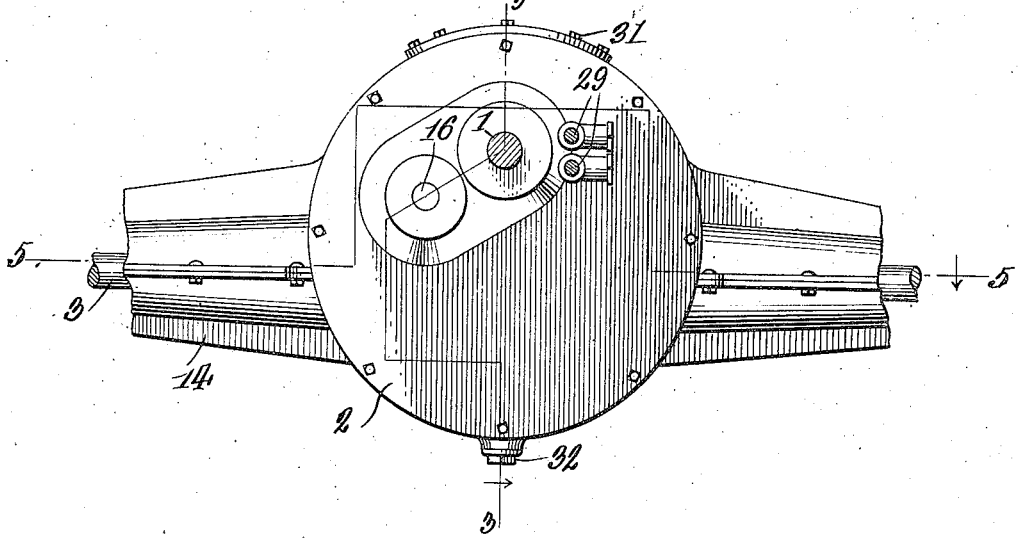
Figure 1 is a side elevation of the improved transmission casing.
Figure 2:
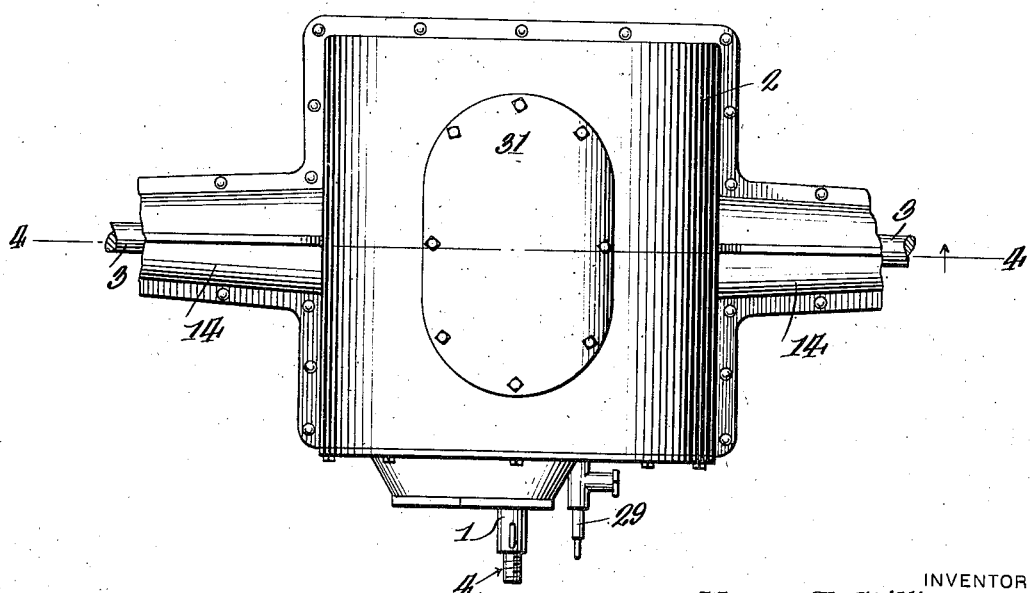
Fig. 2 is a top plan view thereof.

In automobile construction the present practice is to mount the transmission mechanism at some place centrally of the chassis and adjacent to the engine, while the differential mechanism is mounted on the rear shaft.

By reference to the drawings and more particularly to Fig. 5, it will be seen that the drive shaft 1 projects into a casing 2. The casing 2 is mounted on the rear end of an automobile in a rigid manner and is arranged to receive the ends of the rear shaft 3. In the present instance the shaft 1 is connected with the motor in any suitable manner, a threaded portion 4 being provided to facilitate such connection.

Supported in the housing 2, is a gear casing 5. The gear casing 5 is rectangular in shape and is open at its upper side so that inspection of the mechanism therein may be readily made. The casing 5 is also provided with a flanged end 6 which is suitably provided with bolt openings through which the gear casing 5 may be secured to their housing 2 as shown in Fig. 5, and form a closure for the corresponding open end of the housing 2.

The casing 5 forms the carrying member for all of the driving gear mechanisms and for this purpose is provided with suitable bearings 7 and 8 wherein the shaft 1 and the squared extension 9 thereon, are journaled. Mounted on the squared shaft 9 is a worm drive pinion 10 which meshes with a worm gear 11, so that upon rotation of the worm pinion 10 the gear 11 will be driven. Associated with the gear 11, is a gear housing 12 which contains suitable planetary gear mechanisms whereby the shaft ends 3 of the rear axle are driven in a well known manner.

The shafts 3 are journaled in suitable bearings 13 in extensions 14 of the housing 2, and also in bearing pillars 15 disposed adjacent to the gear housing 12. Supported in other bearing portions of the casing 5, is a counter-shaft 16 which as shown in Fig. 5 is disposed parallel to the shafts 1 and 9.

The shaft 16 has the usual reverse pinion 17, low gear 18, intermediate gear 19 and driving gear 20, mounted thereon. A low and reverse gear 21 is mounted on the squared shaft 9 at one side of the worm 10, while a high or second gear 22 is mounted on the shaft 9 at the other side of the worm pinion 10. The gear 21 coöperates with the gears 17 and 18, while the gear 22 coöperates with a driving pinion 23 the pinion 23 being shown more particularly in Fig. 7 of the drawings. In Fig. 7 it will be observed that the gear 23 is secured on the end of the shaft 1 and is provided with a recess 24 arranged to receive roller bearings 25 on which the rounded end 26 of the squared shaft 9, is journaled. The gear 23 is also provided with an internally toothed surface 27 with which a similarly toothed collar 28 formed integrally with the gear 22, is adapted to engage.

The gears 21 and 22 are shifted on the shaft 9 according to the manner in which it is desired to drive the vehicle, by shifting rods 29. The rods 29 have connections within convenient reach of the operator.

By reference to Figs. 4 and 6 of the drawings it will be seen that the housing 2 is provided with ribs or guide members 30 which are for the purpose of keeping the inner gear casing 5 in position and facilitate the placing and removing of the gear casing 5 in the housing 2. In this connection it should be particularly observed that as previously stated, the casing 5 is a unit. This is so because all of the various driving gear members may be assembled in the casing 5, on the workman's bench before it is placed in the housing 2. The convenience of this arrangement will be obvious, since in assembling or disassembling the transmission mechanism, the bolts securing the flange 6 to the housing 2, need only be removed whereupon the casing 5 can be slid out of the housing 2 on the ribs 30.

Prior to removing the gear casing 5, it is of course, necessary to disconnect the worm gear from the drive gear 11 and then remove the drive gear from the planetary gear mechanism within the housings 12, but this removal of the gears specified may be readily accomplished by the removal of the cover plate 31, thus allowing access to the gears mentioned for their removal.

It will at once be obvious to those skilled in the art that in providing the gear casing 5 within the housing 2, by placing the various driving gears 17, 21, 22, 20, etc., at either side of the worm pinion 10, a balanced arrangement is had, and the entire transmission and differential mechanisms are contained in one housing. A drain plug 32 is provided at the bottom of the housing 2 through which foreign matter and surplus grease may be removed, while the cover plate 31 allows access to the interior of the housing and casing.

While the construction and arrangement of the parts is that of a preferred construction, obviously modifications and variations thereof may be made without departing from the spirit of the invention or scope of the claims.

I claim:

1. In a drive mechanism, the combination of a housing, a gear casing disposed within the housing, transmission gears journaled in the gear casing, differential gear mechanism driven by the transmission gearing, and means for supporting the gear casing within the housing.

2. In a drive mechanism, the combination of a housing having an opening at one end, a gear casing insertible in the opening and having a flange adapted to be bolted thereover, ribs on the housing for supporting the gear casing whereby the gear casing may be slid from the housing, and power transmission mechanism supported in the gear casing removable therewith.

3. In a drive mechanism, the combination of a housing having an open end, a gear casing insertible in said opening and having a flange arranged to be bolted thereover, ribs for supporting the gear casing, axle ends extending through the housing into the casing from opposite sides, a driving element on the axle ends, a drive shaft and a counter-shaft journaled in the casing at right angles to the axles, a driving element on the drive shaft meshing with the driving element on the axle ends, and a transmission gearing arranged on the drive and counter shafts in balanced relationship.

4. In a drive mechanism, the combination of a gear housing, a gear casing insertible in the gear housing and forming a closure for one end thereof, axle ends projecting through the housing into the gear casing, gear mechanism carried by the gear casing for rotating the axle ends, and said gear mechanism being disposed in balanced relationship at either side of the axle ends.

5. In a drive mechanism, the combination of a housing, having an opening formed therein, guide flanges carried within said housing, a gear casing insertible in said housing upon said guide flanges, a transmission mechanism carried within said casing, and a differential gear mechanism driven by said transmission mechanism.

6. In a gear mechanism, the combination of a housing, said housing having an opening at one end, a gear casing insertible in said opening and having a flange adapted to be bolted to said housing, so that said casing will form a closure for said opening, transmission gears journaled in said casing, and a differential gear mechanism driven by said transmission gears.

7. In a drive mechanism, the combination of a housing, a gear casing positioned within said housing, transmission gearing journaled in said casing, a differential gear mechanism journaled upon said housing and extending into said casing so that said transmission gearing will drive said differential gear mechanism.

8. In a drive mechanism, the combination of a housing, a casing carried within said housing, axle ends extending through said housing into said gear casing from opposite sides, a driving element on the axle ends, a drive shaft and a counter-shaft journaled in said casing at right-angles to said axle, a driving element on said drive shaft connected with the driving element on the axle ends and a transmission gear arranged on the drive and counter shaft in balanced relationship.

9. In a drive mechanism, the combination of axle ends having a driving element thereon, a drive shaft and a counter shaft extending in right angles to said axle, a driving element on the drive shaft and connected with the driving element on the axle ends, and a transmission gearing arranged on the drive and counter shaft in balanced relationship.

In testimony whereof I affix my signature in presence of two witnesses.

HARRY E. STILLIANS.

Witnesses:
   C. C. DUGAT,
   W. F. COLLINS.